(12) United States Patent
Kawamura et al.

(10) Patent No.: US 7,379,253 B2
(45) Date of Patent: May 27, 2008

(54) IMAGE PICKUP APPARATUS

(75) Inventors: Takayuki Kawamura, Hirakata (JP); Kenji Sasaki, Souraku-gun (JP); Fumio Shinano, Neyagawa (JP); Naoto Yumiki, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 117 days.

(21) Appl. No.: 11/348,085

(22) Filed: Feb. 6, 2006

(65) Prior Publication Data

US 2006/0176584 A1   Aug. 10, 2006

(30) Foreign Application Priority Data

Feb. 7, 2005   (JP) .............................. 2005-030067

(51) Int. Cl.
*G02B 7/02* (2006.01)
(52) U.S. Cl. ................... 359/811; 359/818; 359/819; 359/822; 396/529; 396/542; 348/340; 348/374
(58) Field of Classification Search .............. 359/811, 359/819, 818, 822; 396/529, 542; 348/335, 348/340, 373, 374, 376
See application file for complete search history.

(56) References Cited

U.S. PATENT DOCUMENTS 4,482,234 A * 11/1984 Takagi et al. ............... 396/103

7,173,772 B2 * 2/2007 Masuda ...................... 359/696

FOREIGN PATENT DOCUMENTS

JP    2002-229090    8/2002

* cited by examiner

*Primary Examiner*—Hung X. Dang
*Assistant Examiner*—Joseph Martinez
(74) *Attorney, Agent, or Firm*—Hamre, Schumann, Mueller & Larson, P.C.

(57) ABSTRACT

An image pickup apparatus of the present invention includes: a lens holding frame 10 that holds a lens 30, on the periphery of which a first pair of restricting members composed of convex members 101 and 102 are provided at at least two places; and a circuit board 20 that connects the lens holding frame 10 with a camera main body electrically. The circuit board 20 includes a flexible substrate 21 with wiring that establishes electrical connection, and a reinforcing plate 22 fixed to a part of the flexible substrate 21. The circuit board 20 is fixed to the lens holding frame 10, such that at least a part of the reinforcing plate 22 is disposed between the first pair of restricting members, and that both ends of the part of the reinforcing plate 22 disposed between the first pair of restricting members are restricted by the first pair of restricting members. Consequently, it is possible to provide a camera that is easy to manufacture or to provide a camera that causes little flare.

4 Claims, 10 Drawing Sheets

IMAGE PICKUP APPARATUS

BACKGROUND OF THE INVENTION

1. Field of the Invention

The present invention relates to electrical wiring for a camera, and in particular, to a method of fixing a circuit board to a lens holding frame in a camera in which the lens holding frame in a lens barrel is connected with a camera main body via the circuit board.

2. Description of Related Art

Conventionally, cameras capable of correcting camera shake by moving a part of a lens constituting the cameras have been known. In such cameras, it is required to exchange signals between a lens holding frame and a camera body in order to move the lens or recognize the position of the lens. In a known camera, signals are exchanged via a flexible substrate (see, in particular, Patent document 1).

A camera using the same concept as that of Patent document 1 will be described below with reference to FIGS. 10 to 12. FIG. 10 is an external perspective view of a lens holding frame 1010. FIG. 11 is a perspective view of a circuit board 1020 in a position to be assumed when it is fixed to the lens holding frame 1010. FIG. 12 is a perspective view showing a state in which the circuit board 1020 is fixed to the lens holding frame 1010.

As shown in FIG. 10, a lens (not shown) is fixed at the center of the lens holding frame 1010. The lens holding frame 1010 is connected electrically with a camera main body (not shown) via the circuit board 1020 shown in FIG. 11. The circuit board 1020 is positioned by a restricting pin 1130b and fixed to the lens holding frame 1010.

As shown in FIG. 11, the circuit board 1020 includes a holding-frame-side fixing portion 1212 and a main-body-side fixing portion 1213 that are connected with each other via a lead-out portion 1211. At the base of the lead-out portion 1211, restricting holes 1230a and 1230b are provided. The circuit board 1020 is a substrate containing a flexible material such as polyimide.

As shown in FIG. 12, in order to fix the circuit board 1020 to the lens holding frame 1010 and the camera main body (not shown), the holding-frame-side fixing portion 1212 and the main-body-side fixing portion 1213 are fixed to the lens holding frame 1010 and the camera main body (not shown), respectively, and restricting pins 1130a and 1130b are inserted into the restricting holes 1230a and 1230b, respectively. When the restricting pins 1130a and 1130b are inserted into the restricting holes 1230a and 1230b in this manner, the lead-out portion 1211 can be fixed reliably to the lens holding frame 1010.

However, in order to fix the lead-out portion 1211 to the lens holding frame 1010, it is necessary to insert the restricting pins 1130a and 1130b into the restricting holes 1230a and 1230b. This operation is difficult since the restricting holes 1230a and 1230b are small in size, resulting in low efficiency in manufacturing a camera.

Further, a conventional camera has a problem that flare is caused by a light beam reflected by the lead-out portion 1211. Patent document 1: JP 2002-229090 A (in particular, FIG. 1)

SUMMARY OF THE INVENTION

To solve the afore-mentioned problems, it is an object of the present invention to provide a camera that is easy to manufacture and a camera that causes little flare.

To solve the afore-mentioned problems, a first camera according to the present invention includes: a lens holding frame that holds a lens, on the periphery of which a first pair of restricting members composed of convex members are provided at at least two places; and a circuit board that connects the lens holding frame with a camera main body electrically. The circuit board includes a flexible substrate with wiring that establishes electrical connection, and a reinforcing plate fixed to a part of the flexible substrate, and the circuit board is fixed to the lens holding frame, such that at least a part of the reinforcing plate is disposed between the first pair of restricting members, and that both ends of the part of the reinforcing plate disposed between the first pair of restricting members are restricted by the first pair of restricting members.

A second camera according to the present invention includes: a lens holding frame that holds a lens; and a circuit board that connects the lens holding frame with a camera main body electrically, wherein in the case of leading out the circuit board in a direction parallel to an optical axis of the lens, the circuit board is led out above a horizontal center line of the lens when the camera is held in an erect posture.

A third camera according to the present invention includes: a lens holding frame that holds a lens; and a circuit board that connects the lens holding frame with a camera main body electrically. In the case of leading out the circuit board in a direction parallel to an optical axis of the lens, the circuit board is disposed such that a normal line from a center of the lens and a vertical line with respect to a surface of the circuit board led out in a direction of the optical axis do not coincide with each other.

DETAILED DESCRIPTION OF THE INVENTION

The camera according to the present invention includes: a lens holding frame that holds a lens; a first pair of restricting members composed of convex members provided at at least two places on a periphery of the lens holding frame; and a circuit board that connects the lens holding frame with a camera main body electrically.

The camera according to the present invention further may include a second pair of restricting members composed of second convex members provided at at least two places on the periphery of the lens holding frame, wherein the reinforcing plate also may be restricted by the second pair of restricting members in a direction different from a direction in which the reinforcing plate is restricted by the first pair of restricting members.

Further, the part of the reinforcing plate disposed between the first pair of restricting members may assume a state of being deformed elastically, and the circuit board may be fixed to the lens holding frame by an elastic force of the part of the reinforcing plate disposed between the first pair of restricting members.

Further, at least one of the convex members of the first pair of restricting members may be provided so as to make an acute angle with the periphery of the lens holding frame.

Embodiment 1

1. General Description

The present invention relates to electrical wiring for a camera. In more detail, the invention relates to a method of fixing a circuit board to a lens holding frame in a camera in which the lens holding frame in a lens barrel is connected with a camera main body via the circuit board. According to the present invention, the circuit board can be fixed to the lens holding frame easily, resulting in easy manufacture of a camera.

The lens holding frame is a holding frame that holds, for example, a correcting lens mounted on an optical camera shake correction system, or the like. In the case of inner-shift camera shake correction, the correcting lens has to be driven. To drive the correcting lens, it is necessary to provide an actuator in the lens holding frame that holds the correcting lens, and to supply electric power to the actuator. For supplying power to the actuator, the lens holding frame is connected with the camera main body via the circuit board.

Note here that the present invention is not limited to a camera with an optical camera shake correction function, but is applicable widely to cameras in which the lens holding frame is connected with the camera main body via the circuit board.

2. Configuration of Lens Holding Frame

Figure 1:
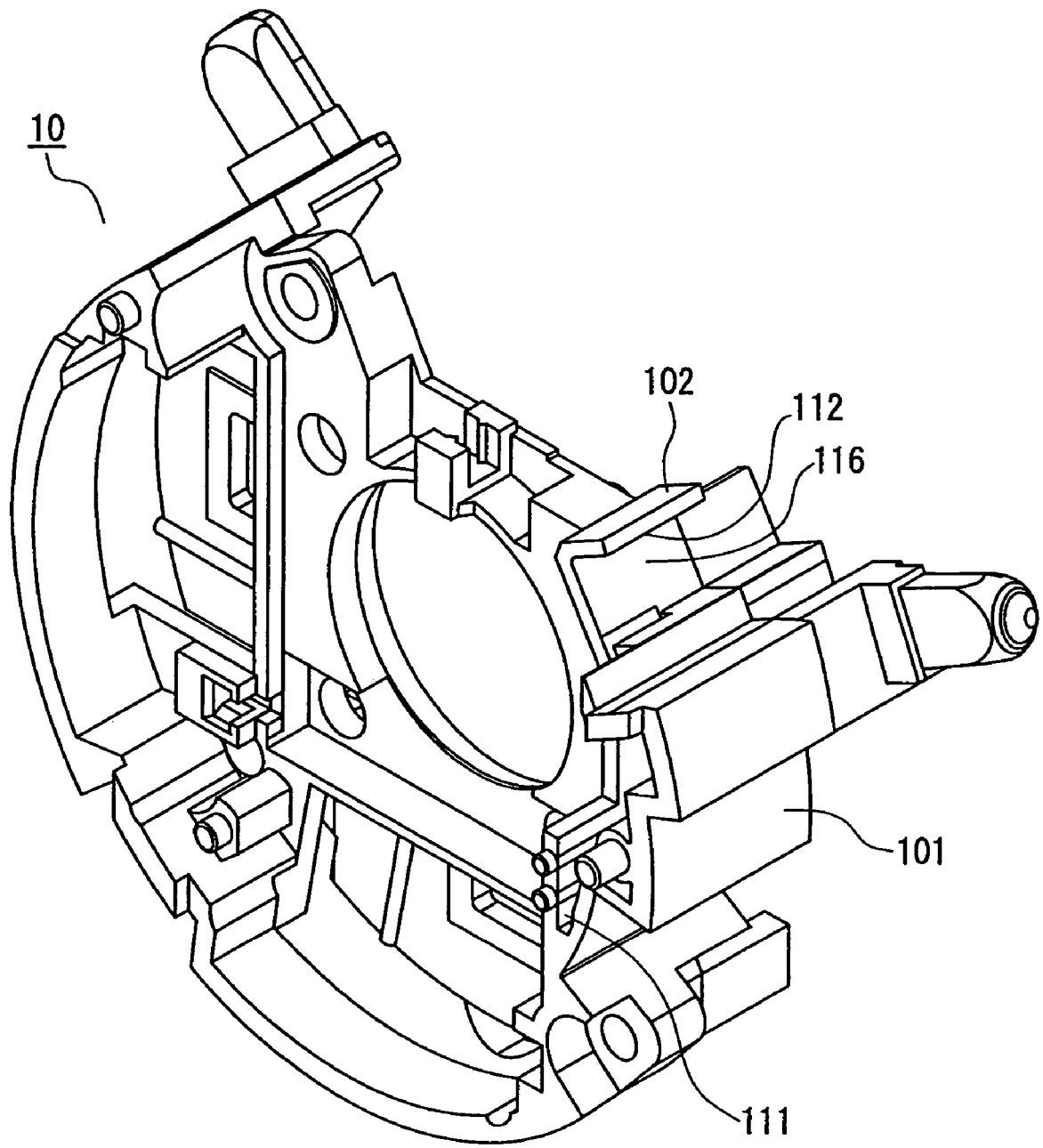
FIG. 1 is a perspective view of a lens holding frame according to the present embodiment.

FIG. 1 is an external perspective view of a lens holding frame 10. The lens holding frame 10 is provided in a lens barrel (not shown). On the periphery of the lens holding frame 10, a first convex member 101 and a second convex member 102 are provided. Regions at the bases of the first convex member 101 and the second convex member 102 that face each other are referred to as a first restricting portion 111 and a second restricting portion 112, respectively. A space between the first convex member 101 and the second convex member 102 is referred to as a storage portion 116. Thus, the storage portion 116 forms a part of the periphery of the lens holding frame 10.

It is possible to mount a lens (not shown) at the center of the lens holding frame 10. The lens holding frame 10 is mounted in the lens barrel in a position shown in FIG. 1. In other words, the upper part in FIG. 1 corresponds to an upper part when the camera is held in an erect posture, and the lower part in FIG. 1 corresponds to a lower part when the camera is held in an erect posture.

Figure 2:
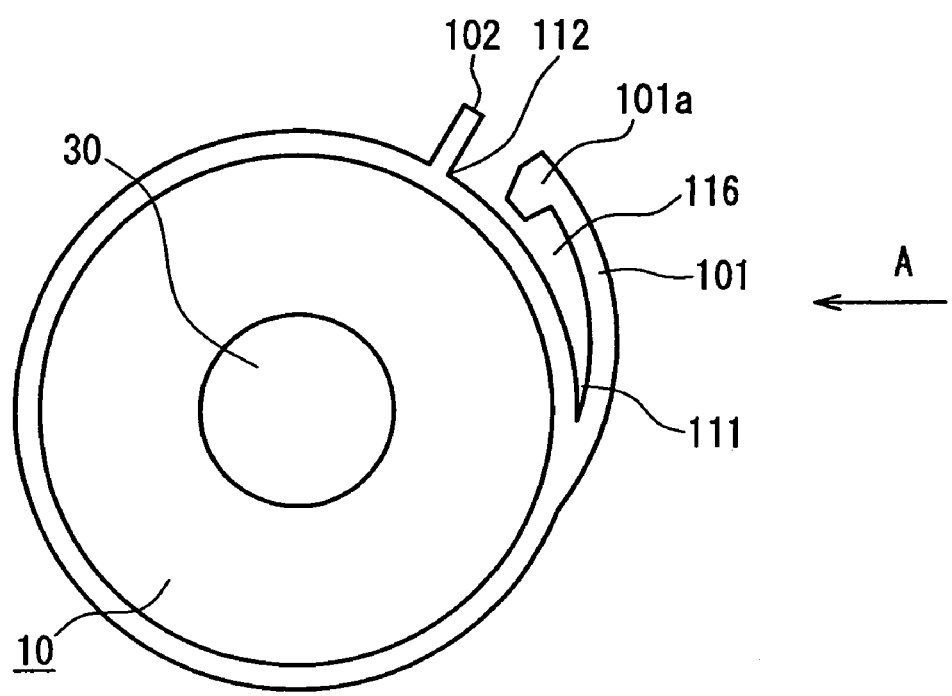
FIG. 2 is a schematic plan view of the lens holding frame according to the present embodiment.

FIG. 2 is a plan view schematically showing the configuration of the lens holding frame 10. The first convex member 101 is provided so as to make an acute angle with the periphery of the lens holding frame 10. In other words, the first restricting portion 111 is angled acutely to form a pocket shape. Further, a protruding retainer portion 101a is formed at a front end of the first convex member 101. This is provided to retain a circuit board 20 stored in the storage portion 116, as described later. The retainer portion 101a can prevent the circuit board 20 from being detached easily from the storage portion 116.

Figure 3:
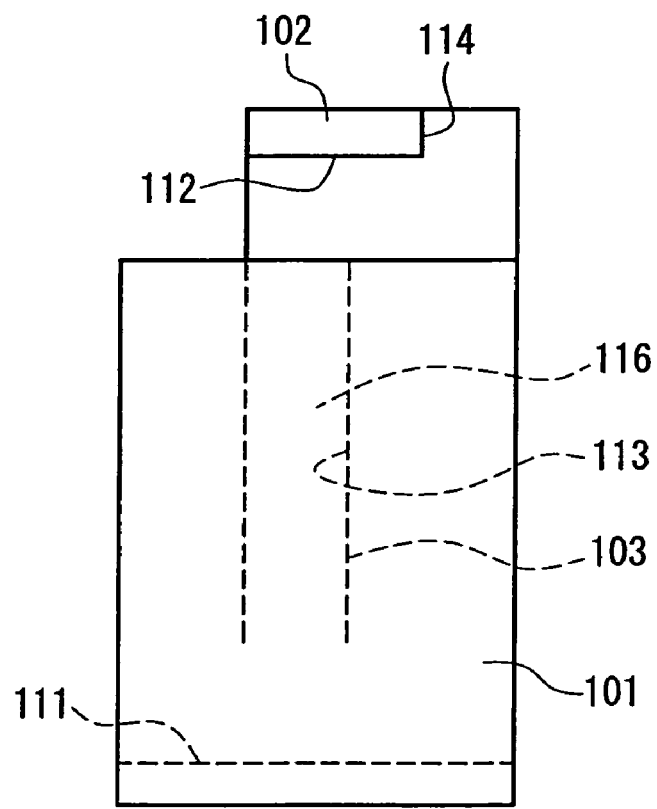
FIG. 3 is a schematic side view of the lens holding frame according to the present embodiment.

FIG. 3 is a side view schematically showing the configuration of the storage portion 116 as seen from a direction shown by an arrow A in FIG. 2. FIGS. 2 and 3 show views seen from different directions for convenience in description.

As shown in FIG. 3, a third convex member 103 is provided on a lower side of the storage portion 116, and forms a restricting portion referred to as a third restricting portion 113. Further, a lower side of the second convex member 102 forms a fourth restricting portion 114. As mentioned above, the third convex member 103 and the second convex member 102 are provided on the periphery of the lens holding frame 10.

The first convex member 101 and the second convex member 102 are given as examples of a convex member of the present invention. A pair of restricting members composed of the first convex member 101 and the second convex member 102 is given as an example of a first pair of restricting members of the present invention. The third convex member 103 and the second convex member 102 are given as examples of a second convex member of the present invention. A pair of restricting members composed of the third convex member 103 and the second convex member 102 is given as an example of a second pair of restricting members of the present invention.

3. Configuration of Circuit Board

Figure 4:
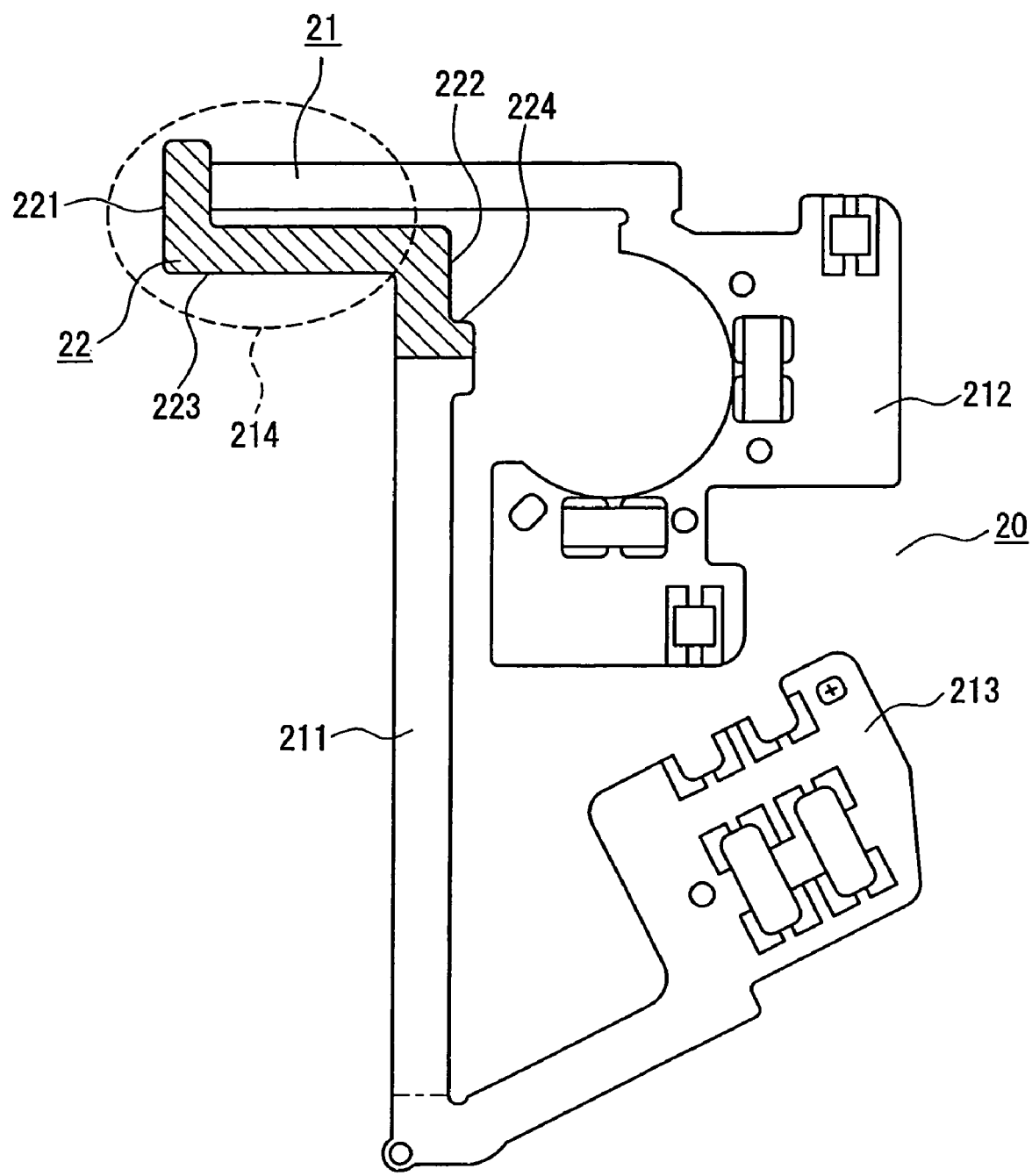
FIG. 4 is a plan view of a circuit board according to the present embodiment.

FIG. 4 is a plan view of the circuit board 20 before being mounted on the lens holding frame 10. The circuit board 20 includes a flexible substrate 21 and a reinforcing plate 22. Other members such as a resistor may be mounted on the flexible substrate 21 in advance.

The flexible substrate 21 is provided with electrical wiring. The electrical wiring is provided to establish an electrical connection between electrical parts mounted on a side of the lens holding frame 10 and electrical parts mounted on a side of the camera main body. When the flexible substrate 21 is mounted on the camera, a holding-frame-side fixing portion 212 is fixed to the lens holding frame 10, and a main-body-side fixing portion 213 is fixed to the camera main body. The flexible substrate 21 is made of a flexible material such as polyimide, for example. The electrical wiring is formed of copper or the like. The flexible substrate 21 is separated from a master substrate by punching or the like.

The reinforcing plate 22 is fixed to a part of the flexible substrate 21 by means of an adhesive or the like. The reinforcing plate 22 may be made of polyethylene terephthalate (PET). However, the present invention is not limited thereto, and polycarbonate (PC), polyimide, and the like, for example, are also available. When the reinforcing plate 22 is fixed to the flexible substrate 21 in this manner, a part of the flexible substrate 21 where the reinforcing plate 22 is fixed can be more elastic than a part where the reinforcing plate 22 is not fixed. The reinforcing plate 22 has a plurality of sides, and is formed such that a first side 221 and a second side 222 face each other and a third side 223 and a fourth side 224 face each other. Note here that the third side 223 and the fourth side 224 are not parallel to the first side 221 and the second side 222.

In the flexible substrate 21, a folded portion 214 and a lead-out portion 211 are formed between the holding-frame-side fixing portion 212 and the main-body-side fixing portion 213. More specifically, as shown in FIG. 4, the flexible substrate 21 is led out from the holding-frame-side fixing portion 212 in one direction, and then is folded to form a folded portion 214. The lead-out portion 211 is formed of an extension of the folded portion 214, and the main-body-side fixing portion 213 is formed of an extension of the lead-out portion 211.

4. Fixing of Circuit Board to Lens Holding Frame

Figure 5:
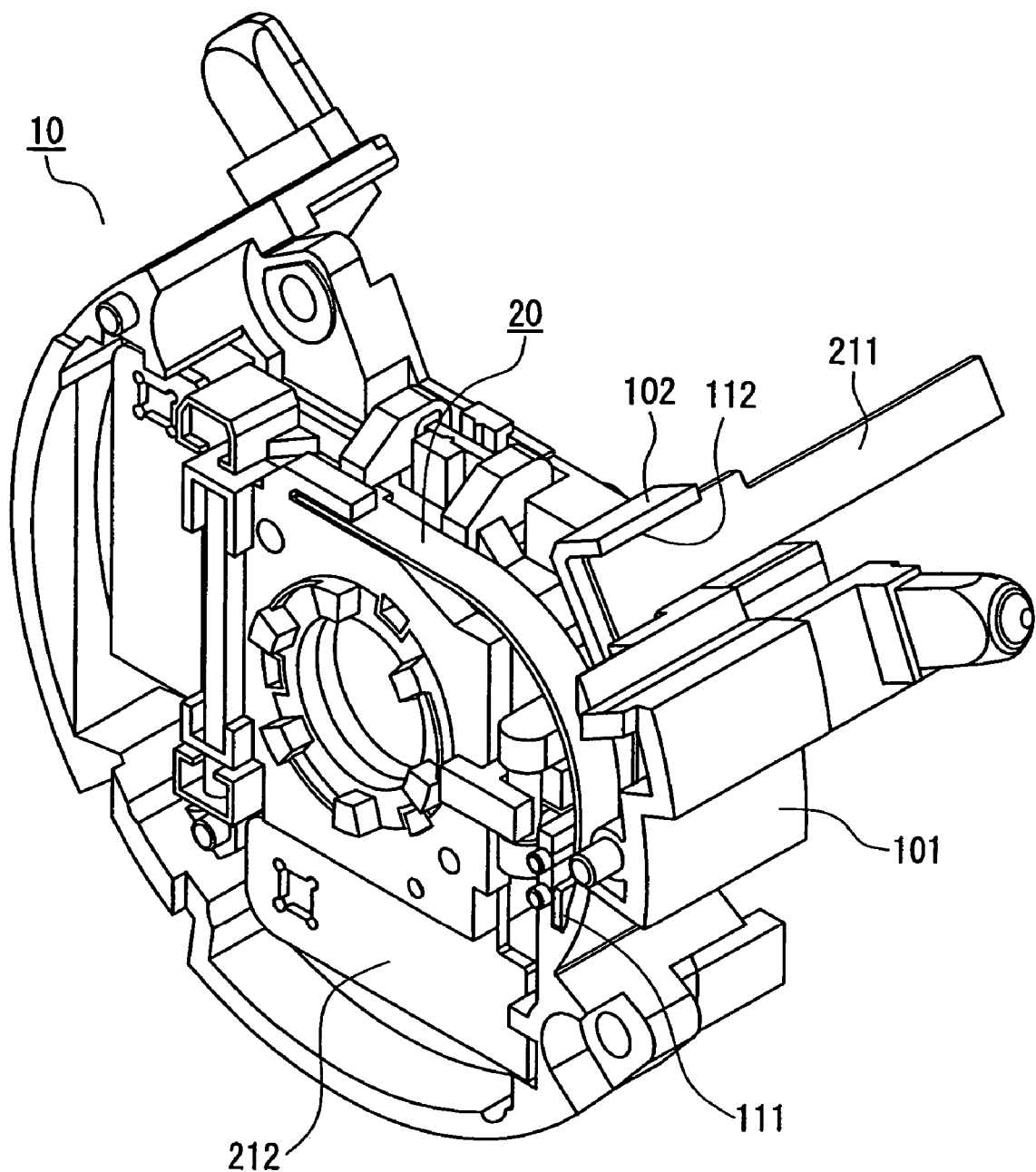
FIG. 5 is a perspective view showing a state in which the circuit board is fixed to the lens holding frame according to the present embodiment.
Figure 6:
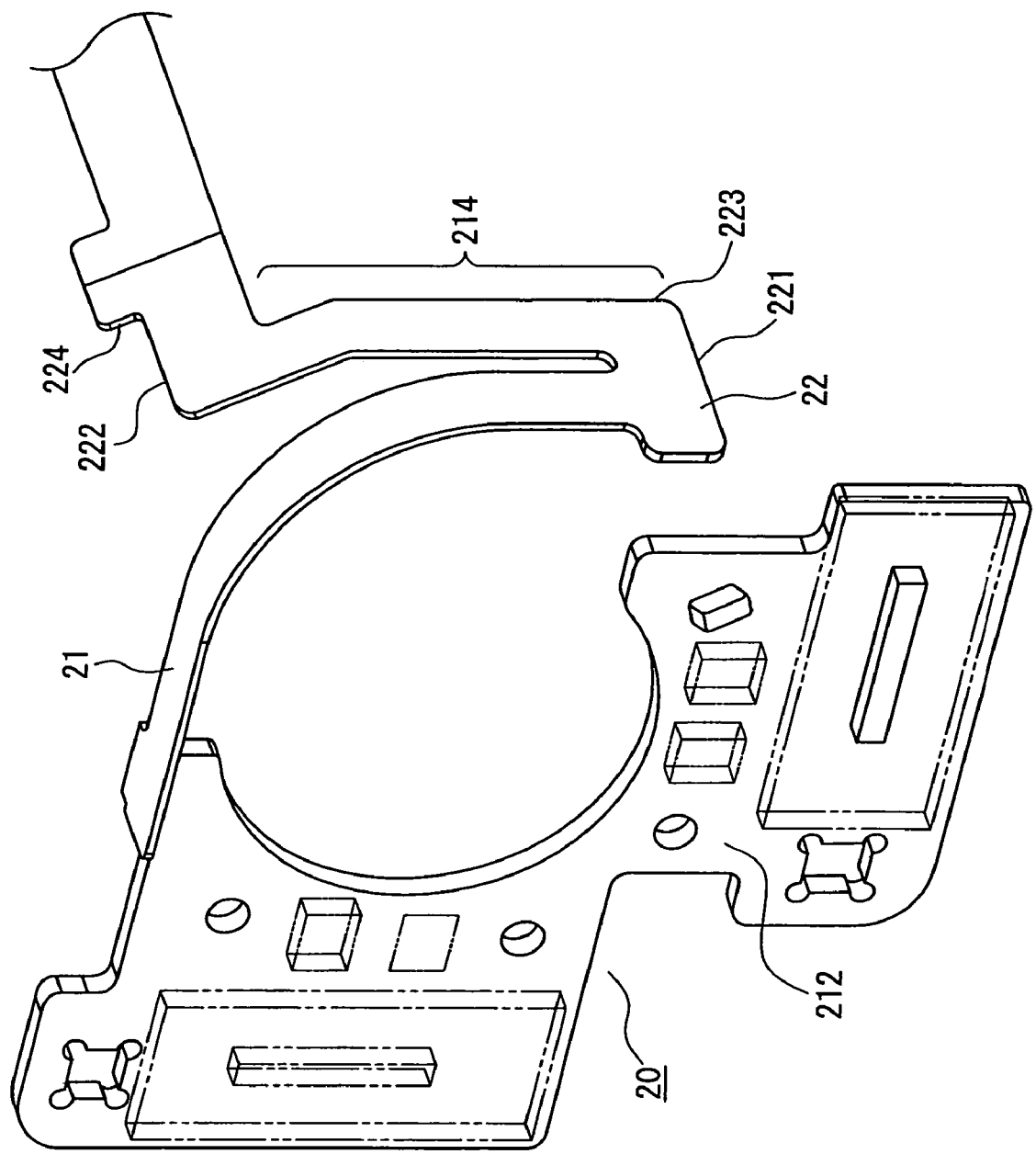
FIG. 6 is a perspective view of the circuit board in a position to be assumed when it is fixed to the lens holding frame according to the present embodiment.
Figure 7:
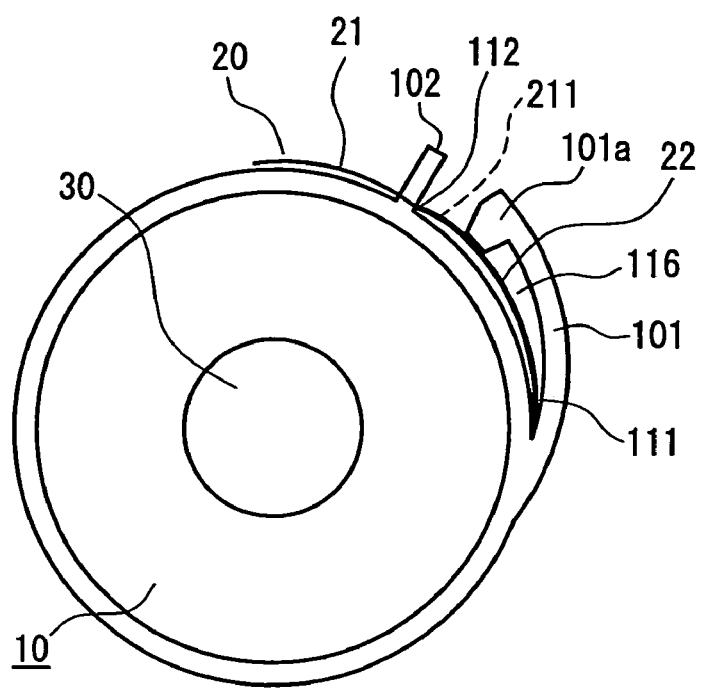
FIG. 7 is a schematic plan view showing a state in which the circuit board is fixed to the lens holding frame according to the present embodiment.

FIG. 5 is a perspective view showing a state in which the circuit board 20 is fixed to the lens holding frame 10. FIG. 6 is a perspective view showing only the circuit board 20 so as to provide a clear understanding of the state of the circuit board 20 at this time. Further, FIG. 7 is a schematic plan view of the lens holding frame 10 at this time, and FIG. 8 is a schematic side view of the storage portion 116 at this time.

In order to fix the circuit board 20 as shown in FIG. 5, initially, the holding-frame-side fixing portion 212 shown in FIG. 6 is fixed to the lens holding frame 10, and the main-body-side fixing portion 213 (see FIG. 4) is fixed to the camera main body (not shown). The fixing of the holding-frame-side fixing portion 212 and the main-body-side fixing portion 213 is performed by allowing bosses provided on the lens holding frame 10 and the camera main body (not shown) to be pressed lightly into holes provided on the circuit board 20, followed by soldering. Note here that the fixing may be performed using screws (not shown) or the like. At this time, the folded portion 214 and the lead-out portion 211 are not fixed.

Then, the folded portion 214 is fixed to the lens holding flame 10 according to the following procedure.

Figure 8:
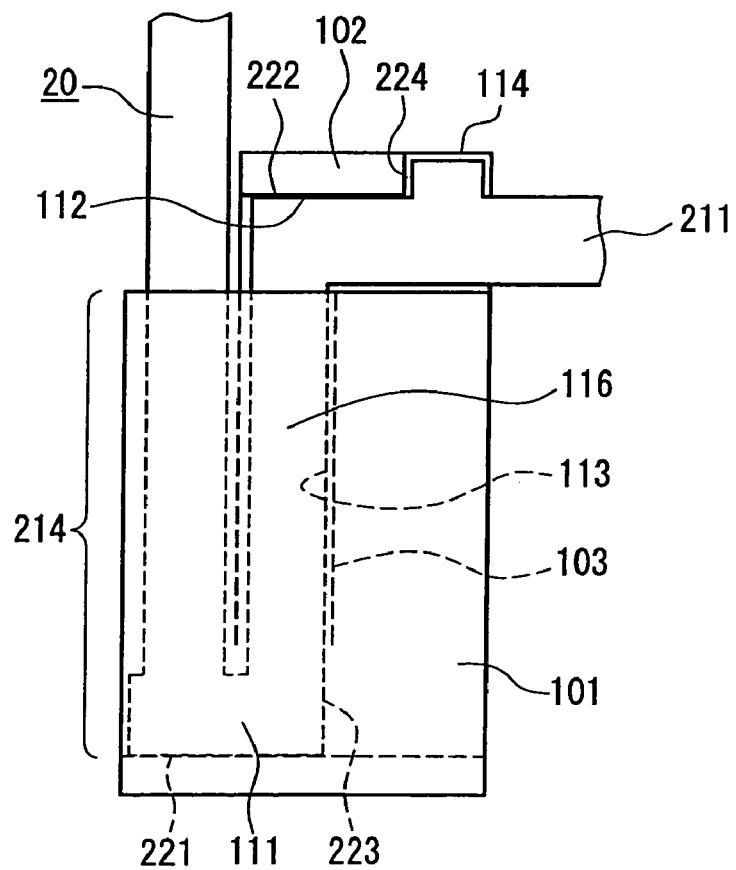
FIG. 8 is a schematic side view showing a state in which the circuit board is fixed to the lens holding frame according to the present embodiment.

As shown in FIG. 8, initially, the folded portion 214 is stored in the storage portion 116, and is disposed so that that the position of the first side 221 of the reinforcing plate 22 is restricted by the first restricting portion 111. In other words, the first side 221 is inserted into the pocket-shaped space of the first restricting portion 111. Then, the folded portion 214 is disposed so that the position of the second side 222 is restricted by the second restricting portion 112. Further, as shown in FIG. 8, the folded portion 214 is disposed so that the positions of the third side 223 and the fourth side 224 are restricted by the third restricting portion 113 and the fourth restricting portion 114, respectively, as the second side 222 is restricted. The folded portion 214 can be fixed to the lens holding frame 10 in this manner. Therefore, it is possible to eliminate the need for a conventional operation of allowing restricting pins of the lens holding frame to pass through restricting holes of the circuit board, or the like. As a result, a camera can be manufactured easily.

Next, a detailed description will be given of a mechanism for fixing the folded portion 214 to the lens holding frame 10 according to the above-mentioned procedure.

The length between the first side 221 and the second side 222 is set to be longer than that between the first restricting portion 111 and the second restricting portion 112. Thus, when the folded portion 214 is disposed so that the position of the first side 221 of the reinforcing plate 22 is restricted by the first restricting portion 111 and the position of the second side 222 is restricted by the second restricting portion 112 as described above, the reinforcing plate 22 is held in a resiliently bent state. FIG. 7 shows a state at this time.

As shown in FIG. 7, the reinforcing plate 22 is disposed between a first pair of restricting members composed of the first convex member 101 and the second convex member 102 in a resiliently bent state. In other words, the reinforcing plate 22 is deformed elastically. When deformed in an elastically deformable range, the reinforcing plate 22 produces an elastic force to return to its initial flat state. The elastic force is exerted on the first convex member 101 and the second convex member 102. Thus, when the positions of both the ends (the first side 221 and the second side 222) of the reinforcing plate 22 are restricted by the first pair of restricting members, the circuit board 20 can be fixed to the lens holding frame 10 by the elastic force of the reinforcing plate 22. Further, the reinforcing plate 22 is retained by the retainer portion 101a to be prevented from being detached easily from the storage portion 116.

Further, as shown in FIG. 8, the reinforcing plate 22 is disposed between a second pair of restricting members (the third convex member 103 and the second convex member 102). This allows the position of the reinforcing plate 22 to be restricted also in a direction (vertical direction in FIG. 8) different from a direction (horizontal direction in FIG. 8) in which it is restricted by the first convex member 101 and the second convex member 102. As a result, it is possible to prevent the reinforcing plate 22 from being detached easily from the storage portion 116.

5. Anti-Flare Measures 5-1. Definition of Flare

Flare refers to a phenomenon in which an unnecessary light beam other than a necessary optical signal is incident on an image pickup device of a camera, causing image degradation. According to the present embodiment, it is possible to reduce the occurrence of flare.

5-2. Disposition of Lead-Out Portion 211

As is evident from FIG. 8, the circuit board 20 is folded at the first restricting portion 111 to form the folded portion 214 in such a manner as to run back and forth once between the first convex member 101 and the second convex member 102. Therefore, in the case of leading out the circuit board 20 in a direction parallel to an optical axis of the lens (not shown), it is possible, as shown in FIGS. 5 and 7, to lead out the circuit board 20 above a horizontal center line of a lens 30 when the camera is held in an erect posture. In other words, the lead-out portion 211 can be disposed above the horizontal center line of the lens 30. As a result, the occurrence of flare can be reduced. FIGS. 5 and 7 are a perspective view and a schematic plan view, respectively, showing a state to be assumed when the camera is held in an erect posture.

Next, a detailed description will be given of the reason why the occurrence of flare is reduced when the lead-out portion 211 is disposed above the horizontal center line of the lens 30 when the camera is held in an erect posture.

In general, when a camera is held in an erect posture, a light source such as the sun and a fluorescent lamp often is located above the camera. A light beam entering the lens barrel (not shown) is reflected by a surface of the lead-out portion 211 and causes flare in some cases. To avoid this, in the present embodiment, the lead-out portion 211 is disposed above the horizontal center line of the lens 30 as shown in FIGS. 5 and 7, so that incident light can be reflected less by the surface of the lead-out portion 211. Consequently, it is possible to reduce the likelihood of flare, resulting in a decrease in the occurrence of flare.

5-3. Posture in Which Lead-Out Portion 211 is Disposed

The occurrence of flare also can be reduced due to a posture in which the lead-out portion 211 is disposed.

Figure 9A:
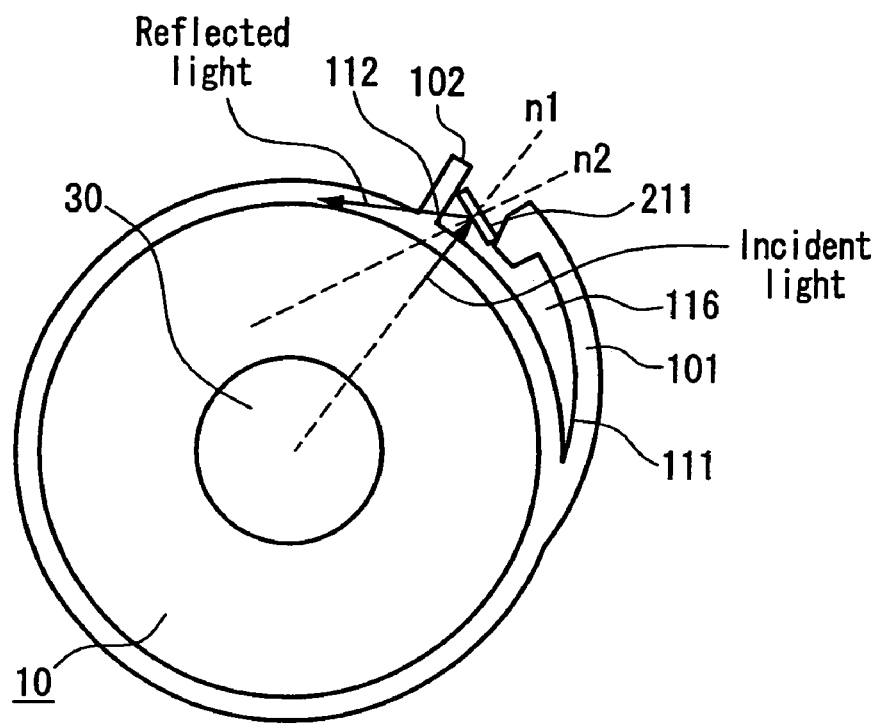
FIG. 9 is a schematic plan view showing a state in which the circuit board is fixed to the lens holding frame according to the present embodiment.
Figure 9B:
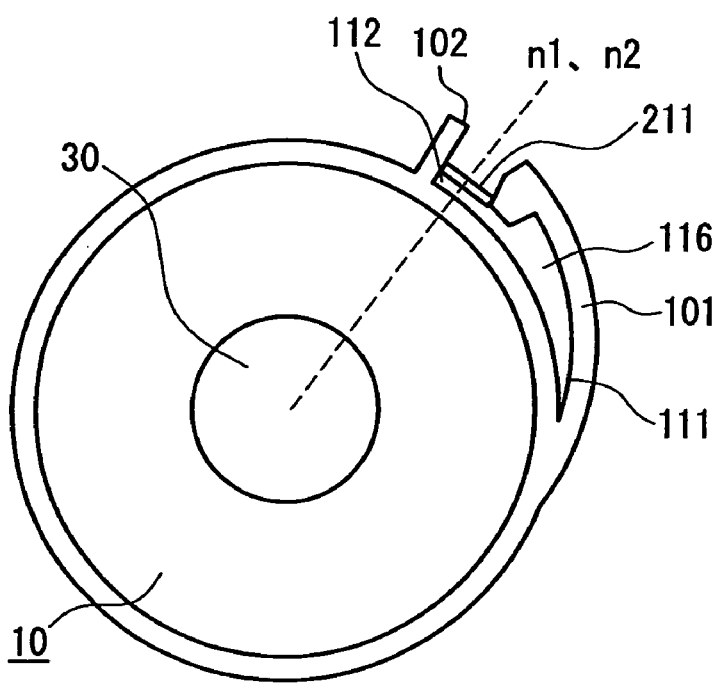
Figure 10:
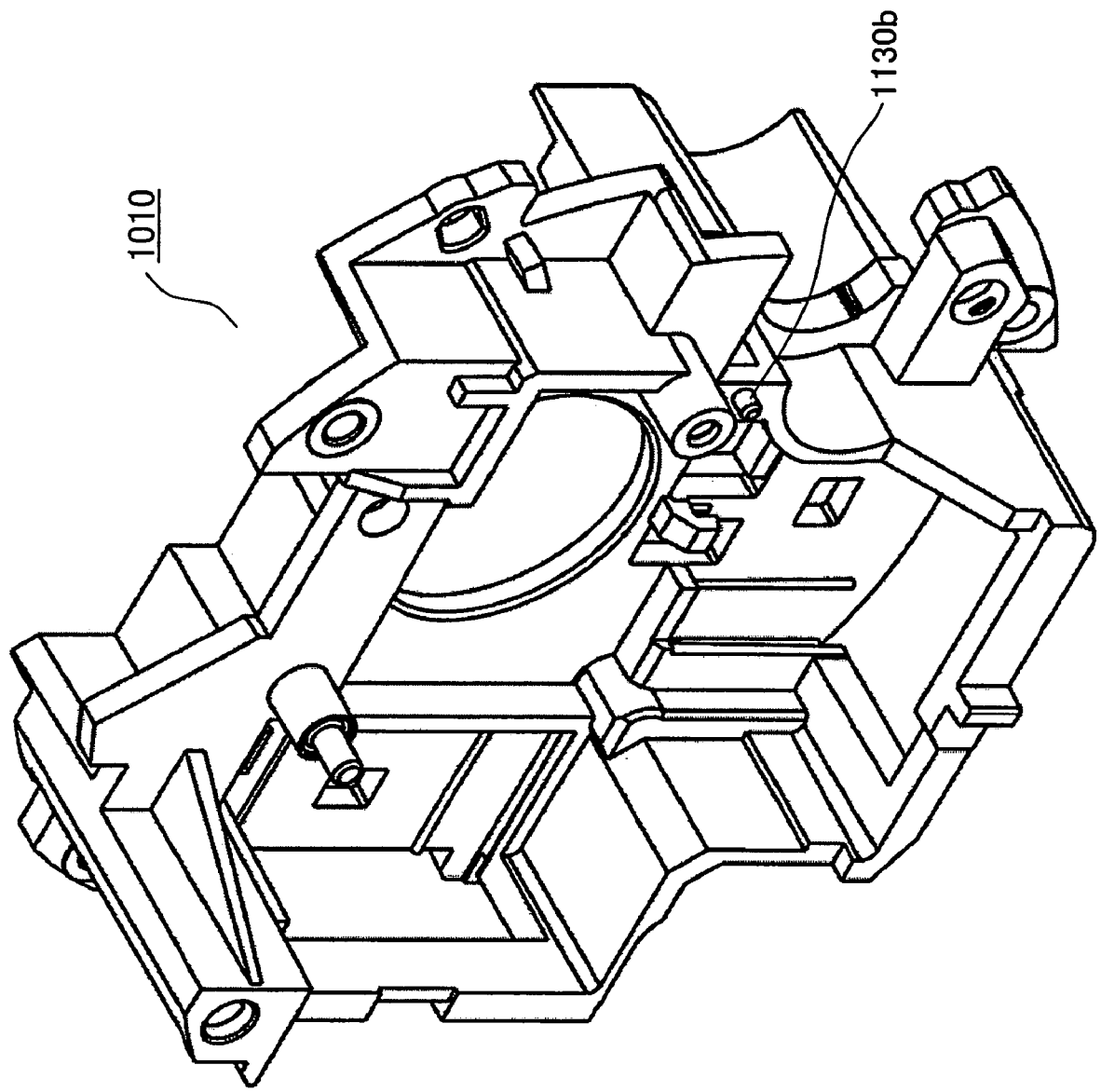
FIG. 10 is a perspective view of a conventional lens holding frame.
Figure 11:
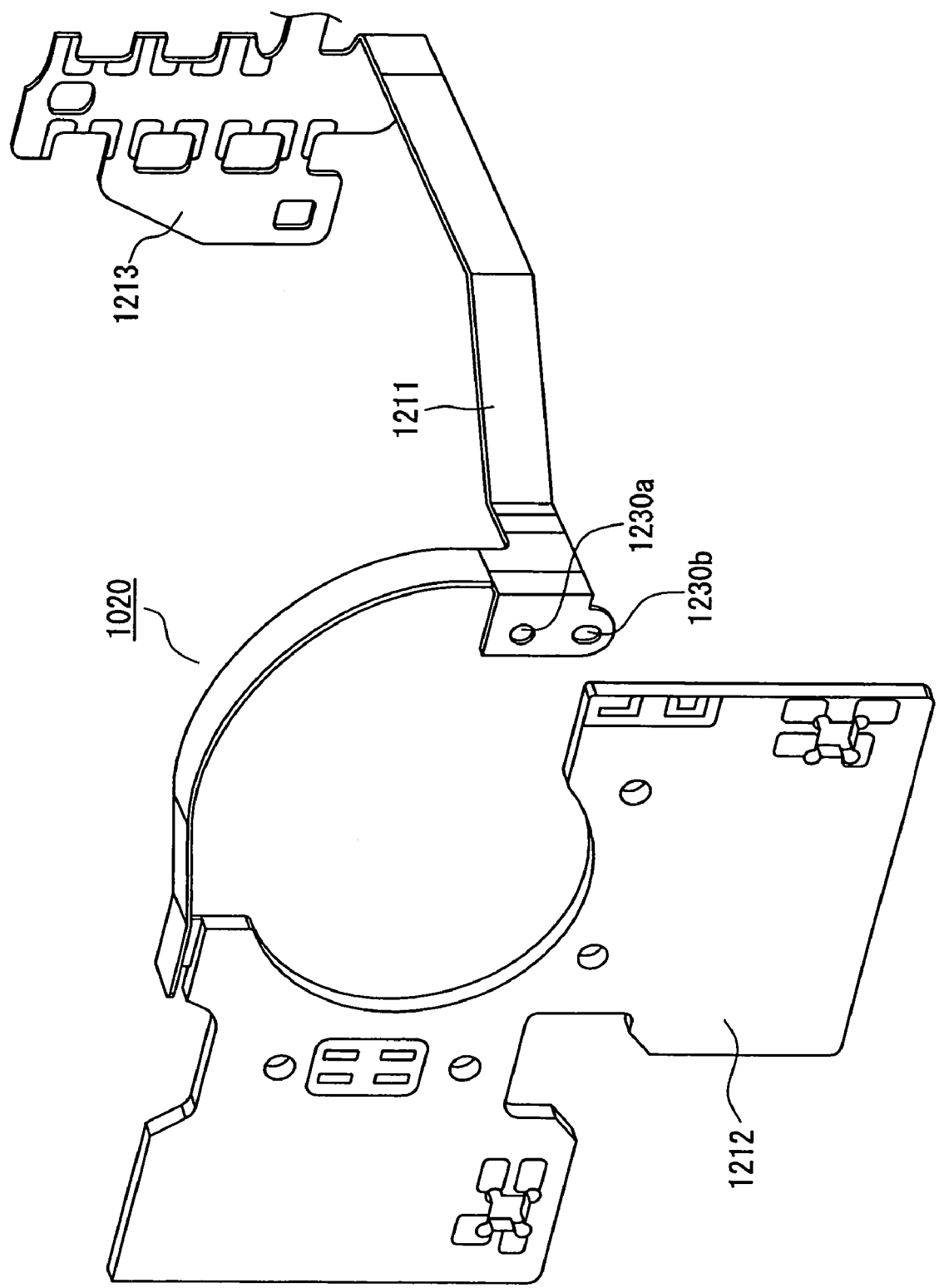
FIG. 11 is a perspective view of a circuit board in a position to be assumed when it is fixed to the conventional lens holding frame.
Figure 12:
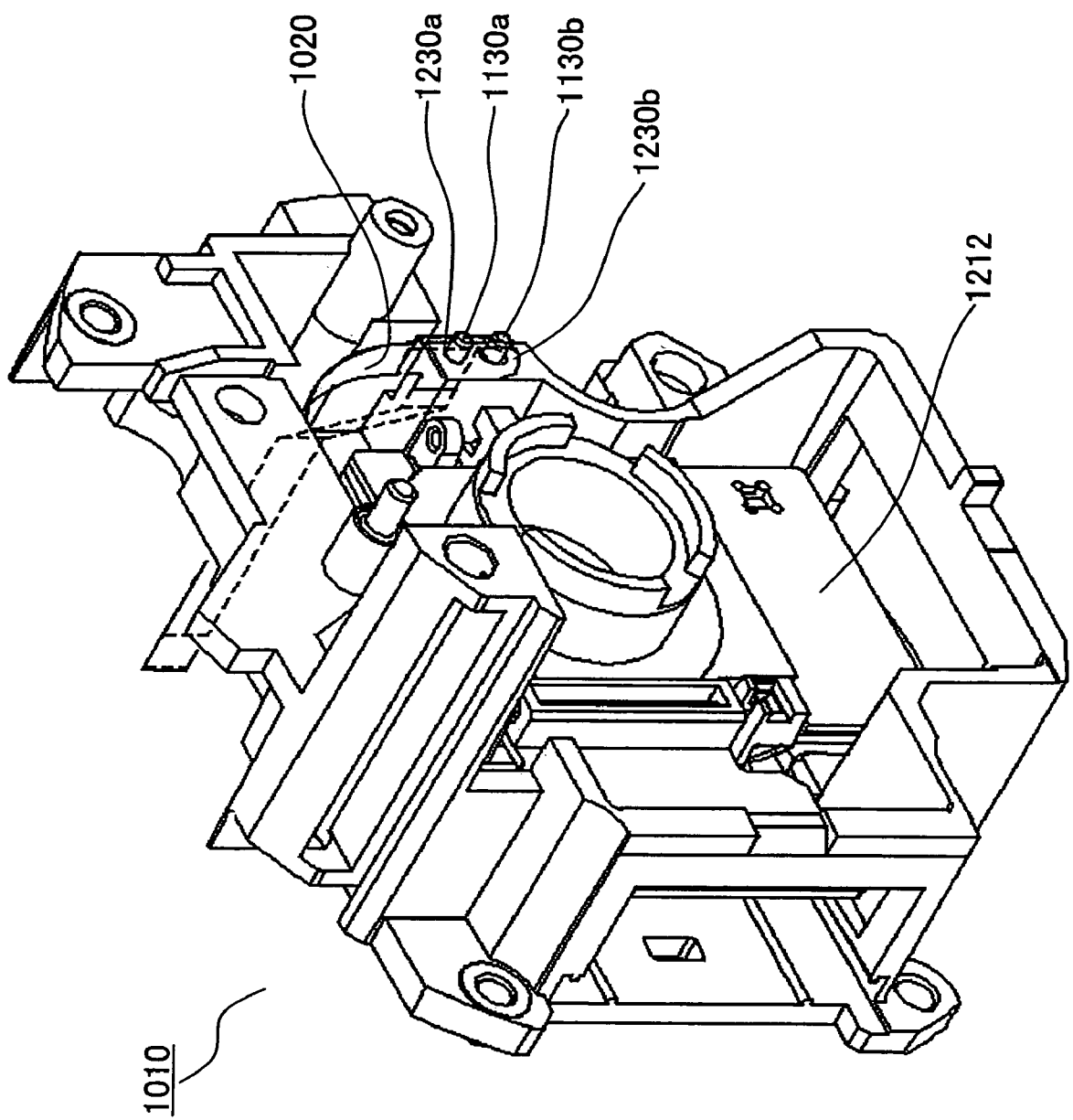
FIG. 12 is a perspective view showing a state in which the circuit board is fixed to the conventional lens holding frame.

FIG. 9 is a schematic plan view illustrating a posture in which the lead-out portion 211 is disposed. FIG. 9A is a schematic plan view of the camera of the present embodiment, and FIG. 9B is a schematic plan view given as a comparative example. In FIGS. 9A and 9B, a normal line from the center of the lens 30 and a vertical line with respect to the surface of the circuit board are indicated by broken lines n1 and n2, respectively.

As shown in FIG. 9A, in the present embodiment, the lead-out portion 211 is disposed such that the normal line n1 and the vertical line n2 do not coincide with each other. By this disposition, even if incident light is reflected by the surface of the lead-out portion 211, there is a small likelihood that the light is reflected toward the center of the lens 30. The reason for this is that incident light that causes flare is likely to be incident from the center of the lens 30. Consequently, the occurrence of flare can be reduced.

On the other hand, as shown in FIG. 9B, when the lead-out portion 211 is disposed such that the normal line n1 and the vertical line n2 coincide with each other, a light beam is likely to be reflected toward the center of the lens 30. The reason for this is that incident light that causes flare is likely to be incident from the center of the lens 30, as mentioned above.

6. Summary

The camera of the present embodiment includes: a lens holding frame 10 that holds a lens 30, on the periphery of which a first pair of restricting members composed of convex members 101 and 102 are provided at at least two places; and a circuit board 20 that connects the lens holding frame 10 with a camera main body electrically. The circuit board 20 includes a flexible substrate 21 with wiring that establishes electrical connection, and a reinforcing plate 22 fixed to a part of the flexible substrate 21. The circuit board 20 is fixed to the lens holding frame 10, such that at least a part of the reinforcing plate 22 is disposed between the first pair of restricting members, and that the positions of both ends of the part of the reinforcing plate 22 disposed between the first pair of restricting members are restricted by the first pair of restricting members.

Further, the camera of the present embodiment further includes: a second pair of restricting members composed of the second convex member 102 and the third convex member 103 provided at at least two places on the periphery of the lens holding frame 10. The reinforcing plate 22 also is restricted by the second pair of restricting members in a direction (direction parallel to the optical axis) different from a direction (direction vertical to the optical axis) in which the reinforcing plate 22 is restricted by the first pair of restricting members.

Further, in the camera of the present embodiment, the part (folded portion 214) of the reinforcing plate 22 disposed between the first pair of restricting members assumes a state of being deformed elastically, and the circuit board 20 is fixed to the lens holding frame 10 by an elastic force of the part of the reinforcing plate 22 disposed between the first pair of restricting members.

The first convex member 101 of the present embodiment is provided so as to make an acute angle with the periphery of the lens holding frame 10. This allows the first restricting portion 111 to have a pocket shape, in which the reinforcing plate 22 can be sandwiched.

Further, the camera of the present embodiment includes: a lens holding frame 10 that holds a lens 30; and a circuit board 20 that connects the lens holding frame 10 with a camera main body electrically. In the case of leading out the circuit board 20 in a direction parallel to an optical axis of the lens 30, the circuit board 20 is led out above a horizontal center line of the lens 30 when the camera is held in an erect posture.

Further, the camera of the present embodiment includes: a lens holding frame 10 that holds a lens 30; and a circuit board 20 that connects the lens holding frame 10 with a camera main body electrically. In the case of leading out the circuit board 20 in a direction parallel to an optical axis of the lens 30, the circuit board 20 is disposed such that a normal line n1 from a center of the lens 30 and a vertical line n2 with respect to a surface of the circuit board 20 led out in a direction of the optical axis do not coincide with each other.

In the present embodiment, both the ends (the first side 221 and the second side 222) of the reinforcing plate 22 are restricted. However, the present invention is not limited thereto. For example, the circuit board 20 may be fixed to the lens holding frame 10 such that a part of the reinforcing plate 22 is disposed between the first pair of restricting members, and that both ends of the part of the reinforcing plate 22 disposed between the first pair of restricting members are restricted thereby.

Further, in the present embodiment, the first restricting portion 111 has a pocket shape. However, the present invention is not limited thereto, and the first restricting portion 111 may be formed at right angles, for example. Note here that when the first restricting portion 111 has a pocket shape as in the present embodiment, the reinforcing plate 22 simply can be sandwiched therein, resulting in easy fixing of the reinforcing plate 22.

The present invention relates to electrical wiring for a camera, and in particular, to a method of fixing a circuit board to a lens holding frame in a camera in which the lens holding frame in a lens barrel is connected with a camera main body via the circuit board. According to the present invention, it is possible to provide a camera that is easy to manufacture or to provide a camera that causes little flare. Therefore, the present invention is applicable to a digital still camera, a digital video camera, an analog camera, a film camera, a mobile telephone terminal with a camera, a terminal with a camera, and the like.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A camera comprising:
a lens holding frame that holds a lens;
a first pair of restricting members composed of convex members provided at at least two places on a periphery of the lens holding frame; and
a circuit board that connects the lens holding frame with a camera main body electrically, wherein the circuit board includes a flexible substrate with wiring that establishes an electrical connection, and a reinforcing plate fixed to a part of the flexible substrate, and the circuit board is fixed to the lens holding frame, such that at least a part of the reinforcing plate is disposed between the first pair of restricting members, and that both ends of the part of the reinforcing plate disposed between the first pair of restricting members are restricted by the first pair of restricting members.

2. The camera according to claim 1, further comprising:

a second pair of restricting members composed of second convex members provided at at least two places on the periphery of the lens holding frame, wherein the reinforcing plate also is restricted by the second pair of restricting members in a direction different from a direction in which the reinforcing plate is restricted by the first pair of restricting members.

3. The camera according to claim 1, wherein the part of the reinforcing plate disposed between the first pair of restricting members assumes a state of being deformed elastically, and the circuit board is fixed to the lens holding frame by an elastic force of the part of the reinforcing plate disposed between the first pair of restricting members.

4. The camera according to claim 1, wherein at least one of the convex members of the first pair of restricting members is provided so as to make an acute angle with the periphery of the lens holding frame.

* * * * *